United States Patent
Moore

(10) Patent No.: US 7,409,332 B2
(45) Date of Patent: Aug. 5, 2008

(54) METHOD AND APPARATUS FOR INITIALIZING ITERATIVE TRAINING OF TRANSLATION PROBABILITIES

(75) Inventor: Robert C. Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 10/890,926

(22) Filed: Jul. 14, 2004

(65) Prior Publication Data

US 2006/0015318 A1   Jan. 19, 2006

(51) Int. Cl.
*G06F 17/28* (2006.01)

(52) U.S. Cl. .............................. 704/2; 704/5

(58) Field of Classification Search ........................ None
See application file for complete search history.

(56) References Cited

U.S. PATENT DOCUMENTS

| | | | | |
|---|---|---|---|---|
| 5,991,710 | A | 11/1999 | Papineni et al. | 704/2 |
| 5,995,927 | A | 11/1999 | Li | 704/246 |
| 6,092,034 | A | 7/2000 | McCarley et al. | 704/2 |
| 6,154,722 | A | 11/2000 | Bellegarda | 704/257 |
| 6,304,841 | B1 * | 10/2001 | Berger et al. | 704/2 |
| 6,735,562 | B1 | 5/2004 | Zhang et al. | 704/240 |
| 2002/0165873 | A1 | 11/2002 | Kwok et al. | 707/500 |
| 2003/0191626 | A1 | 10/2003 | Al-Onaizan et al. | 704/8 |
| 2004/0030551 | A1 | 2/2004 | Marcu et al. | 704/240 |
| 2005/0038651 | A1 | 2/2005 | Zhang et al. | 704/233 |
| 2005/0149326 | A1 | 7/2005 | Hogengout et al. | 704/242 |
| 2005/0256711 | A1 | 11/2005 | Lahti | 704/253 |
| 2006/0074664 | A1 | 4/2006 | Lam et al. | 704/255 |

OTHER PUBLICATIONS

Brown, P.F., et al., 1993a, "The Mathematics of Statistical Machine Translation: Parameter Estimation," Computational Linguistics, 19(2):263-311.

Brown, P.F., et al., 1993b, "But Dictionaries are Data too," Proceedings of the ARPA Workshop on Human Language Technology, pp. 205-205, Plainsboro, New Jersey.

Chen, S.F., et al, 1996, "An Empirical Study of Smoothing Techniques for Language Modeling," Proceedings of the 34th Annual Meeting of the Association for Computational Linguistics, pp. 310-318, Santa Cruz, California.

Ding, Y., et al, 2003, "An Algorithm for Word-Level Alignment of Parallel Dependency Trees," Proceedings of the 9th Machine Translation Summit, pp. 95-101, New Orleans, Louisiana.

Dunning, T., 1993, "Accurate Methods for the Statistics of Surprise and Coincidence," Computational Linguistics, 19(1):61-74.

Melamed, I.D., 2000, "Models of Translation Equivalence, Computational Liguistics," 26(2):221-249.

(Continued)

*Primary Examiner*—David R. Hudspeth
*Assistant Examiner*—Samuel G Neway
(74) *Attorney, Agent, or Firm*—Theodore M. Magee; Westman, Champlin & Kelly, P.A.

(57) ABSTRACT

A method of estimating translation probabilities includes converting a set of word alignment scores into translation probabilities and modifying the translation probabilities based on a bilingual corpus to produce modified translation probabilities. Under many embodiments, the translation probabilities are modified using an iterative training algorithm.

18 Claims, 5 Drawing Sheets

OTHER PUBLICATIONS

Mihalcea, R., et al., 2003, "An Evaluation Exercise for Word Alignment," Proceedings of the HLT-NAACL 2003 Workshop, Buildings and Using Parallel Texts: Data Driven Machine Translation and Beyond, pp. 1-6, Edmonton, Alberta.

Moore, R.C., 2001, "Toward a Simple and Accurate Statistical Approach to Learning Translation Relationships Among Words," Proceedings of the Workshop Data-Driven Machine Translation at the 39th Annual Meeting of the Association for Computational Linguistics, pp. 79-86, Toulouse, France.

Moore, R.C., 2002, "Fast and Accurate Sentence Alignment of Bilingual Corpora," Machine Translation: From Research to Real Users (Proceedings, 5th Conference of the Association for Machine Translation in the Americas, Tiburon, California), pp. 135-244, Springer-Verlag, Heidelberg, Germany.

Munteanu, D.S., et al., 2004, "Improved Machine Translation Performance Via Parallel Sentence Extraction from Comparable Corpora," Proceedings of the Human Language Technology Conference of the North American Chapter of the Association for Computational Linguistics (HLT-NAACL 2004), Boston, Massachusetts.

Nevado, F., et al., 2003, "Parallel Corpora Segmentation Using Anchor Words," Proceedings of the 7th International EAMT Workshop on MT and other language technology Tools, Improving MT Through Other Language Technology Tools, Resource and Tools for Building MT, pp. 33-40, Budapest, Hungary.

Och, F.J., et al., 2003, "A Systematic Comparison of Various Statistical Alignment Models," Computational Linguistics, 29(1):19-51.

Och, F.J., et al., 2004, "A Smorgasbord of Features for Statistical Machine Translation," Proceedings of the Human Language Technology Conference of the North American Chapter of the Association for Computational Linguistics (HLT-NAACL 2004), Boston, Massachusetts.

Och, F.J., et al., "A Comparison of Alignment Models for Statistical Machine Translation," Computer Science Departement, University of Technology, Germany, pp. 1086-1090.

Office Action (Aug. 24, 2006) and Responses (Nov. 21, 2006) from U.S. Appl. No. 11/417,325, filed May 3, 2006.

Office Action (Dec. 9, 2005; Feb. 3, 2006) and Responses (Dec. 14, 2005; May 3, 2006) from U.S. Appl. No. 10/924,725, filed Aug. 24, 2004.

Office Action (Dec. 8, 2005; May 25, 2006; Nov. 16, 2006) and Responses (Mar. 8, 2006; Aug. 25, 2006; Jan. 24, 2007) from U.S. Appl. No. 10/924,643, filed Aug. 24, 2004.

* cited by examiner

METHOD AND APPARATUS FOR INITIALIZING ITERATIVE TRAINING OF TRANSLATION PROBABILITIES

BACKGROUND OF THE INVENTION

The present invention relates to statistical word alignment. In particular, the present invention relates to training statistical word alignment models.

In statistical machine translation, parameters are generally trained that estimate the probability of a source language word being translated into one or more target language words. This translation probability can be used to estimate the probability of a sequence of words in the target language given a sequence of words in the source language. For example, under a well known model known as the IBM Model 1, the probability of a sequence of words in the target language given the sequence of words in the source language is estimated as:

$$p(T \mid S) = \frac{\varepsilon}{(l+1)^m} \prod_{j=1}^{m} \sum_{i=0}^{l} tr(t_j \mid s_i)$$
EQ. 1 where p(T|S) is the probability of a sequence of words in the target language given a sequence of words in a source language, m is the number of words in the sequence of target language words, l is the number of words in the sequence of source language words, $\varepsilon$ is the probability that a sequence of words in the target language will be m words long, and $tr(t_j|s_i)$ is the translation probability, which provides the probability of the jth word in the sequence of target language words given the ith word in the sequence of source language words.

The translation probabilities can also be used as part of a statistical word alignment model. Such models are used to identify an alignment between a source sentence and a target sentence, where the alignment is defined as identifying which source words and target words are translations of each other in the two sentences. If the translation model is limited such that each target word can be generated by exactly one source word (including a null word) an alignment a can be represented by a vector $a_1, \ldots, a_m$, where each $a_j$ is the sentence position of the source word generating target word $t_j$ according to the alignment. When this is true, the most likely alignment â of a source sentence and a target sentence according to IBM Model 1 is given by:

$$\hat{a} = \arg\max_a \prod_{j=1}^{m} tr(t_j \mid s_{a_j})$$
EQ. 2 where $s_{a_j}$ is the source word predicted by alignment $a_j$ for target word $t_j$. The notation $\mathrm{argmax}_\alpha f(\alpha)$ means the value of $\alpha$ for which $f(\alpha)$ has the maximum value.

Before a translation probability can be used in an alignment model or in a translation model, it must first be trained. Under the prior art, such translation models have typically been trained using an Expectation-Maximization (EM) algorithm. This algorithm relies on a corpus of paired sentences, where each sentence pair consists of a sentence in the source language and a translation of that sentence in the target language. During the expectation phase of the EM algorithm, counts are developed for word pairs, where a word pair consists of one word from the source language and one word from the target language that occur together in at least one of the paired sentences. Each occurrence of the word pair receives a count depending on the probability of the source word being translated into the target word, according to the current estimate of the translation probabilities.

Initially, each translation probability is set to a uniform distribution over the target language vocabulary. During the maximization phase, the counts are normalized and a probability is re-estimated for each translation. The process is then repeated using the updated translation probability estimates. Mathematically, it has been shown that as the number of iterations of this process increases, the EM algorithm will converge on the maximum likelihood estimates for the translation probabilities.

Under the prior art, this was thought to provide the best set of model parameters for alignment and translation. However, model parameters trained in this way have been less than ideal. One reason for this is that the EM algorithm trains the parameters to best fit the training data. If the training data is not representative of the actual data encountered during translation or alignment, the algorithm will over fit the parameters to describe the training data instead of the actual data.

Thus, new techniques are needed to avoid the over-fitting of translation probability parameters during training.

SUMMARY OF THE INVENTION

A method of estimating translation probabilities includes converting a set of word alignment scores that are not probabilities into translation probability estimates and modifying the translation probabilities based on a bilingual corpus to produce modified translation probability estimates. Under many embodiments, the translation probabilities are modified using an iterative training algorithm.

DETAILED DESCRIPTION OF ILLUSTRATIVE EMBODIMENTS

Figure 1:
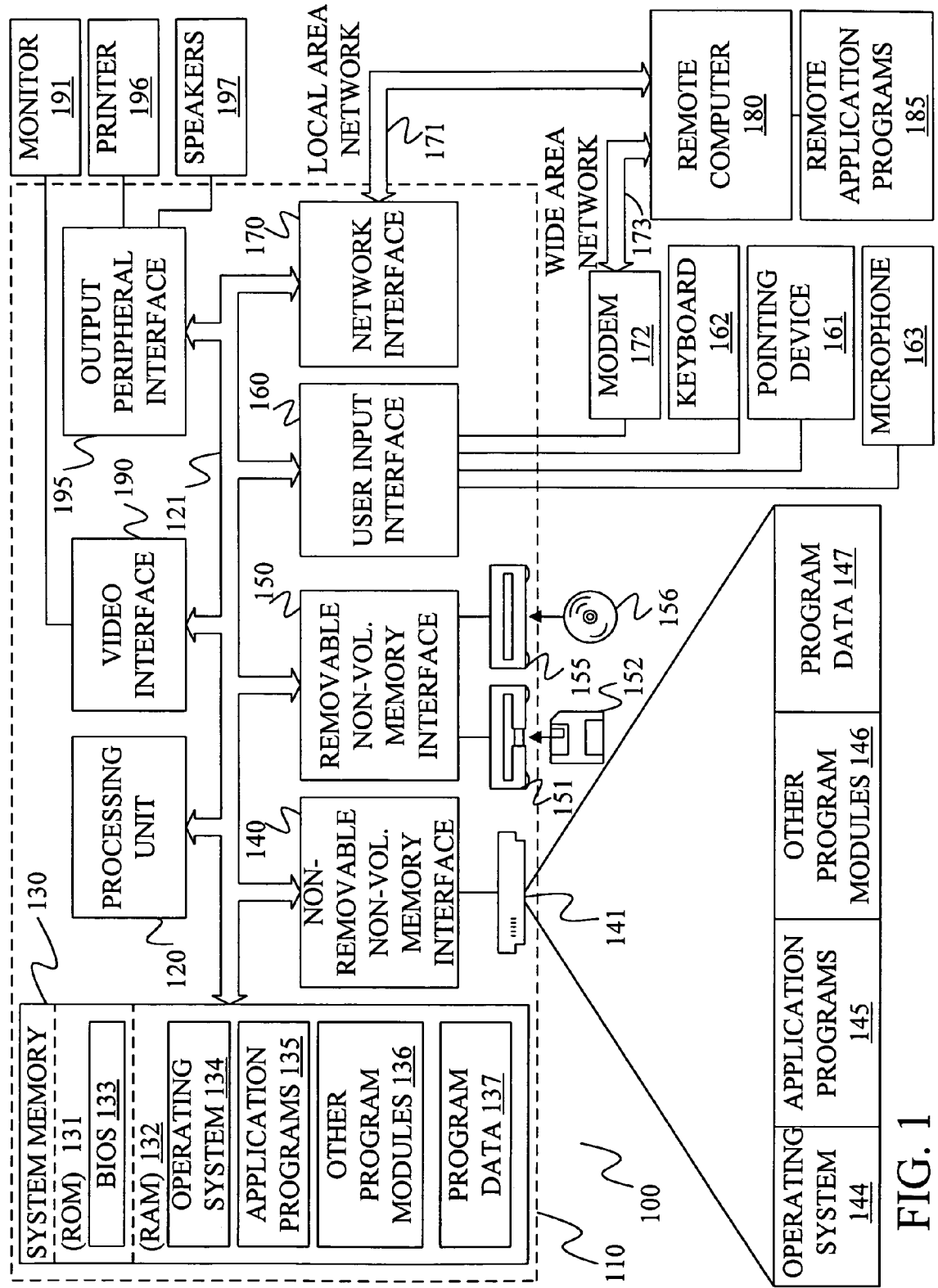
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
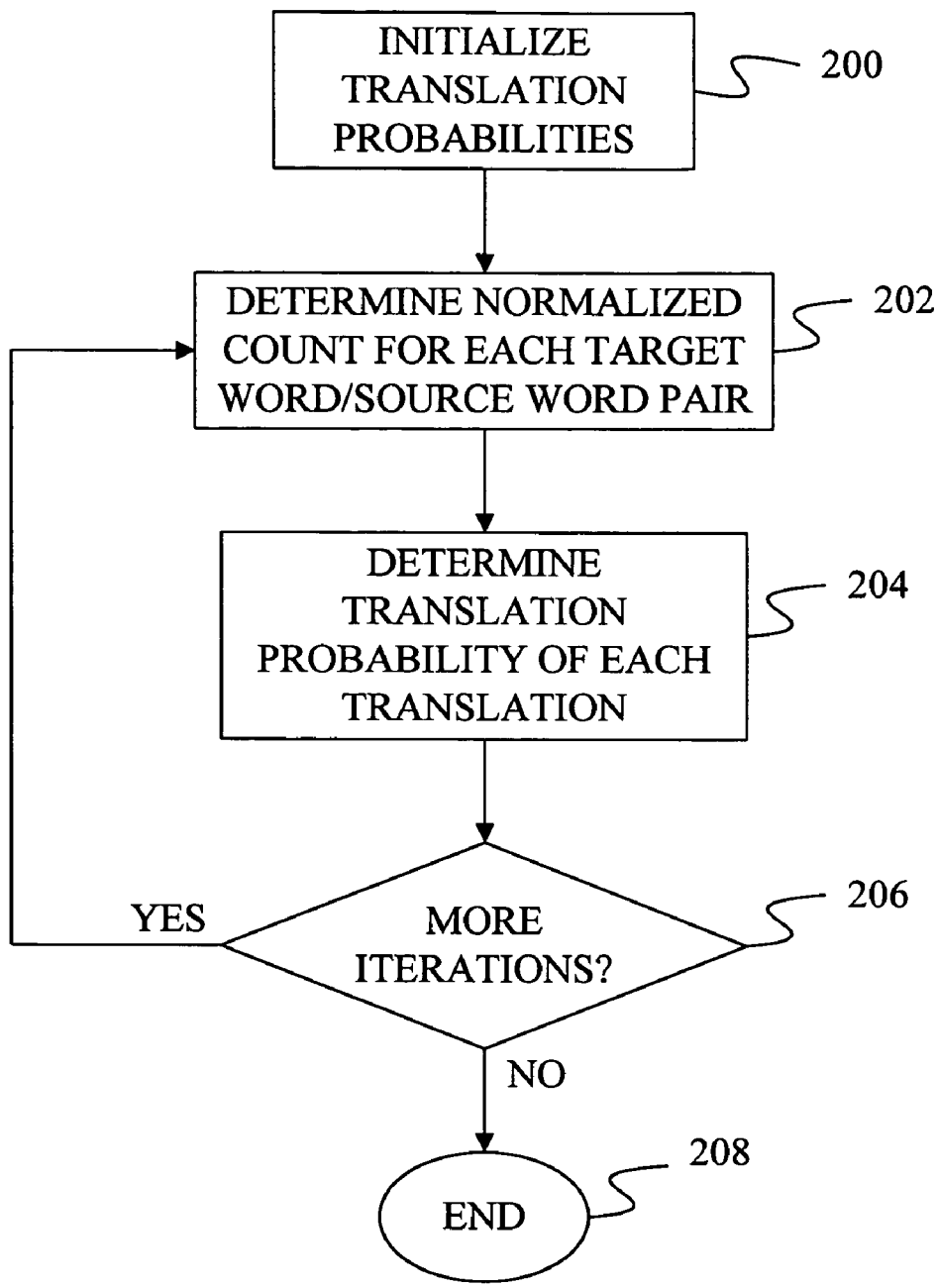
FIG. 2 is a flow diagram of a method of estimating translation probabilities under one embodiment of the present invention.

FIG. 2 provides a flow diagram of a method under the present invention for estimating a set of translation probabilities that can be used in a translation model or an alignment model. This method is built upon a method described in Brown et al., The Mathematics of Statistical Machine Translation: Parameter Estimation, *Computational Linguistics*, 19(2):263-311, 1993. In particular, it is built upon the Model 1 translation model constructed in Brown. However, embodiments of the present invention modify the method in Brown to improve the resulting translation probability estimates.

At step 200 of FIG. 2, the translation probabilities are initialized. Under the prior art, the translation probabilities were initialized to a uniform distribution over the target language vocabulary. The unspoken justification for this is that EM training of the translation probabilities will always converge to the same set of parameter values from any set of initial values, so the initial values should not matter. However, the present inventor believes that the parameters obtained at convergence do not produce the most accurate word alignments. As such, under some embodiments of the present invention, the parameters are prevented from reaching the values that would theoretically be obtained through EM training. In some embodiments, this is done by not performing the EM algorithm to convergence. In other embodiments, this is done by reserving probability mass for unseen data.

Because the parameters are selected before convergence, the initialization point for the parameters can affect their final value. As such, under some embodiments of the present invention, the translation probabilities are initialized so that they better approximate the expected translation probabilities rather than using uniform distributions.

Under one specific embodiment, the translation probabilities are initialized by converting a word association score or word alignment score that is not a probability into a probability estimate. The word association/alignment score provides a measure of the relationship between a word in one language of a bilingual training corpus and a word in the second language of the training corpus. In the present application, a word association score differs from a probability estimate in that sum of the word association scores for all possible events, including events that are not seen in a set of training data, does not have to equal one as it does for a probability estimate. In fact, many individual word association scores can be greater than one.

Under some embodiments, the word association scores for pairs of words that occur infrequently are always substantially lower than those for the highest scoring pairs of words that occur more frequently in sentence pairs in the corpus.

Under one particular embodiment, the word association score is a log-likelihood-ratio (LLR) statistic. This statistic is defined as:

$$LLR(t\mid s) = \sum_{t?\in\{t,\neg t\}}\sum_{s?\in\{s,\neg s\}} c(t?,s?)\log\left[\frac{p(t?\mid s?)}{p(t?)}\right] \qquad \text{EQ. 3}$$

Where t represents an occurrence of a target word in a target sentence, ¬t represents the lack of target word t in a target sentence, s represents the occurrence of a source word in a source sentence, ¬s represents the lack of source word s in a source sentence, t? is a variable that can have values of either t or ¬t, s? is a variable that can have values of either s or ¬s, c(t?,s?) is a count of the number of sentence pairs in which the combination of the occurrence/lack of occurrence of t and s appears at least once, p(t?|s?) is the probability of the occurrence/lack of occurrence of word t given the occurrence/lack of occurrence of word s in a sentence pair, and p(t?) is the probability of the occurrence/lack of occurrence of word t in a sentence.

The probability p(t?|s?) is estimated by dividing the number of sentence pairs in which there is an occurrence/lack of occurrence of t and an occurrence/lack of occurrence of s by the number of sentence pairs in which there is an occurrence/lack of occurrence of s. The probability p(t?) is estimated by dividing the number of sentence pairs in which there is an occurrence/lack of occurrence of t by the number of sentence pairs in the corpus.

Using equation 3, a separate LLR score is determined for each target word-source word pair. In cases where this results in attempting to evaluate an expression of the form 0·log(0), which is normally undefined, the value of that expression is taken to be 0.

Word pairs can have high LLR scores if they are strongly negatively associated as well as if they are strongly positively associated. Since only positively associated words are good candidates for being mutual translations, we discard any word pair whose observed probability of occurring together is no more than that expected by chance alone, by requiring that p(t,s)>p(t)·p(s).

In some embodiments of the present invention, word pairs with an LLR score lower than a certain threshold may be discarded and not considered any further as possible translations of each other.

To improve the distribution of the word association scores, one embodiment of the present invention raises the word association scores to a power of n, where n is any positive real number. Thus, n may have an integer component and a fractional component. If n is greater than one, this step increases the variance of the word association scores. If n is between zero and one, this step reduces the variance of the word association scores. In most embodiments, a value of n that is greater than one is used to further differentiate scores associated with rare words from scores associated with frequent words. This is especially useful if the scores are converted into probabilities because the increase in the variance helps to keep the probability associated with rare words relatively low.

Once the word association score has been generated, it is converted into a probability estimate under some embodiments of the invention. To do this, the range of scores must be transformed into a range between zero and one. One way to do this is to separately normalize the scores associated with different source words. For a selected source word, each score that is associated with that source word is divided by the sum of all of the scores associated with that source word.

Under a second embodiment, the scores are normalized using a single normalization factor for all of the source words. By doing this, it is possible to map the relative distribution of the scores into probabilities such that rare source words that produce low word association scores have low estimated translation probabilities. If a different normalization factor is used for each source word, as found in the first embodiment, the estimated translation probabilities associated with rare source words can become large even if the word association scores for the source word are small.

Under one embodiment, the single normalization factor is calculated by determining the sum of the scores for each source word and selecting the highest sum as the normalization factor. This will cause the probabilities associated with the highest sum source word to sum to one, while the probabilities associated with all other source words will sum to less than one. For rare source words, the probabilities will sum to much less than one, thereby placing a substantial amount of probability mass in reserve to account for associations between the rare source word and target words that were not seen in the training data.

Under one embodiment, the probabilities estimated from the word association scores are improved upon to take into consideration the possibility that a word in the target language will not align with a word in the source language. This is done by assuming that there is a null or empty token in each sentence of the source language that may be aligned with any word in the corresponding sentence in the target language. Such a null token represents a lack of a word in the source language that corresponds to a word in the target language.

Many word association metrics that are appropriate for estimating initial word translation probabilities for actual words are not appropriate for the null token. For instance, an LLR score for any target word aligning with a null source token is always 0. This occurs because every sentence contains a null token thereby causing p(t|s) to equal p(t). Therefore, if LLR scores for the null token are transformed into probabilities by the method described above, all initial translation probabilities for the null token will be 0.

Therefore, in some embodiments of the present invention, a word association score is not determined for the null tokens. Instead, the initial probability of a target word aligning with a null token is set equal to a predetermined probability associated with the target word.

Under one embodiment, the predetermined probability for the target word is a uniform distribution across all of the words in the target language. Under a different embodiment, the predetermined probability for the target word is the unigram probability of the target word as estimated from the corpus. By using the unigram probability distributions, it is thought that the null token alignments will better reflect the expectation that null tokens often align with frequent function words such as prepositions or determiners.

Under some embodiments, the probabilities for the null tokens are further modified to improve performance. In one embodiment, the probabilities are multiplied by a constant. This increases the probabilities of the null tokens relative to the other source words and has been found by the present inventor to provide better alignments.

The probabilities estimated from the word association scores may be used directly as the final translation probabilities or may be improved upon using an iterative algorithm such as an Expectation Maximization algorithm. If the probabilities are to be improved upon, the process continues at step 202, where the pairs of aligned sentences in the training corpora are used to develop counts for possible word translations. In particular, for a given pair of sentences, an original word/translated word pair is formed for each possible pairing of a word in the sentence of the source language with a word in the sentence of the target language. For example, if the sentence of the target language contains words A, B, and C and the sentence of source language contains words U, V, and W, the word pairs UA, VA, WA, UB, VB, WB, UC, VC, and WC would be formed. In addition, since it is possible that a word in a sentence of the target language will not correspond to any word of source language, a null token "*" is provided as a possible word of the source language. As a result, the additional pairs *A, *B, and *C are formed.

For each word pair in each sentence pair, a normalized count is determined. In particular, the normalized count is calculated as:

$$c(t \mid s; T, S) = J \cdot K \frac{tr(t \mid s)}{\sum_{i=0}^{l} tr(t \mid s_i)} \qquad \text{EQ. 4}$$

where c(t|s;T,S) is the normalized count for the target word t and source word s in target sentence T and source sentence S, $tr(t|s_i)$ is the current estimate of the translation probability for translating the ith word in the source sentence into t, K is the total number of times word s appears in the source sentence, J is the total number of times word t appears in the target sentence, l is the total number of actual words in the source sentence, and $s_0$ is the null token. The normalized counts for each word pair in each sentence pair are summed to give normalized counts c(t|s) for each word pair over all training sentence pairs.

For the first iteration, the translation probabilities are the initial translation probabilities set in step 200. During the first iteration of step 202, the translation probabilities for the null token may or may not be modified by an adjustment value. Experiments suggest that if the initial translation probabilities are estimated from word association scores as described previously, it is best not to modify the null token translation probabilities, but if the initial translation probabilities are set to a uniform distribution, it is best to multiply all the null token translation probabilities by an adjustment value for the first iteration of step 202.

At step 204, the counts for the various word pairs in the training sentences are used to update the translation probabilities. Under some embodiments of the present invention, the translation probabilities are smoothed to prevent the model from becoming too confident about the translation probabilities for rare source words on the basis of very little evidence. Under one embodiment, this smoothing is achieved by adding virtual counts to the counts observed in the training data. This is known as add-n smoothing. In particular, the translation probabilities are estimated as:

$$tr(t \mid s) = \frac{n + c(t \mid s)}{n|V| + \sum_{i=1}^{|W|} c(t_i \mid s)} \qquad \text{EQ. 5}$$

where tr(t|s) is the translation probability for source word s generating target word t, c(t|s) is the normalized count for word pair "st" summed over all sentence pairs (as described above), $c(t_i|s)$ is the normalized count for word pair "$st_i$"

summed over all sentence pairs, "$t_i$" is the ith distinct word in the target language, n is an added virtual count, |W| is the size of the target language vocabulary W observed in the training data, and |V| is the hypothesized size of the total target vocabulary V, which may include words not seen in the training data. Under one embodiment, |V| is 100,000. The value of n is empirically optimized on annotated development test data. The numerator of the right hand side of Equation 5 provides a smoothed expected count for the source word-target word pair, while the denominator provides a smoothed expected count for the number of times the source word produces any target word.

Under some embodiments of the present invention the value of n may be so small as to have no significant effect on the numerator in Equation 5, only having a significant effect on the denominator, due to being multiplied by |V|. In this case, embodiments of the present invention may replace Equation 5 with Equation 6:

$$tr(t \mid s) = \frac{c(t \mid s)}{A + \sum_{i=1}^{|W|} c(t_i \mid s)} \quad \text{EQ. 6}$$

In this equation, the number A replaces n·|V| and is empirically optimized on annotated development test data. This has the advantage that there is no need to estimate n and |V| independently.

Workers skilled in the art will recognize that there are many other methods of smoothing the translation probabilities to prevent the model from becoming too confident about the translation probabilities for rare source words on the basis of very little evidence. These include absolute discounting, Jelinek-Mercer smoothing, and other methods used in statistical language modeling that do not depend on having integer counts. (See Chen, S. F., and Goodman, J. 1999. An empirical study of smoothing techniques for language modeling. Computer Speech and Language 13 (Oct.), 359-394.)

Under the prior art, the translation probabilities associated with null source words have tended to be too low resulting in poor alignments because target words that should be aligned with the null source word are instead being forced into an alignment with an actual source word. The present inventor believes that one reason for the low number of alignments for null source words is that only a single null word is hypothesized for each source sentence. As a result, if a sentence pair contains multiple target words that should be aligned with the null word, the null word will be under counted in comparison to actual source words. For example, if an English source sentence contains two instances of "of" and a corresponding French target sentence contains five instances of "de", the word "of" will receive two counts for every one count for null. Thus, the probability will move toward favoring aligning "de" to "of" over the null token.

To address this, under one embodiment of the present invention, the translation probabilities for the null tokens are increased from the values determined from the counts. Under one specific embodiment, each translation probability is multiplied by a value to produce a modified probability.

Under some embodiments, this involves multiplying each null translation probability by a constant that is set for the entire training corpus. In other embodiments, the translation probabilities for the null tokens are multiplied by a value that is selected based on the length of the particular sentence in which the null token is found. Thus, the translation probabilities for null tokens in longer sentences will by multiplied by larger values than translation probabilities for null tokens in shorter sentences under the assumption that more null tokens are likely to be present in longer sentences than in shorter sentences.

Under many embodiments, the value that is multiplied by the translation probability is a non-integer value and as such may have a fractional portion such as (2.63).

At step 206, the translation probabilities are examined to determine if more iterations are required. If more iterations are required, the process returns to step 202 where a normalized count for each target word/source word pair is determined once again for each sentence pair using the newly estimated translation probabilities. The process repeats steps 204, 206, and 202 until no more iterations are required, and the process of estimating the translation model ends at step 208.

Under one embodiment of the present invention, iterations are repeated until the translation probabilities have stabilized to within some small threshold. This is what is meant by iterating to convergence. Under this embodiment, the final set of probabilities constitutes the trained model.

Under another embodiment, a model is saved after each iteration and tested on annotated development test data. Iterations are repeated until a clear trend is established that further iterations will degrade alignment accuracy on the development test data. At that point, the model produced by any of the iterations that is most accurate on the development test data is selected as the trained model.

Figure 3:
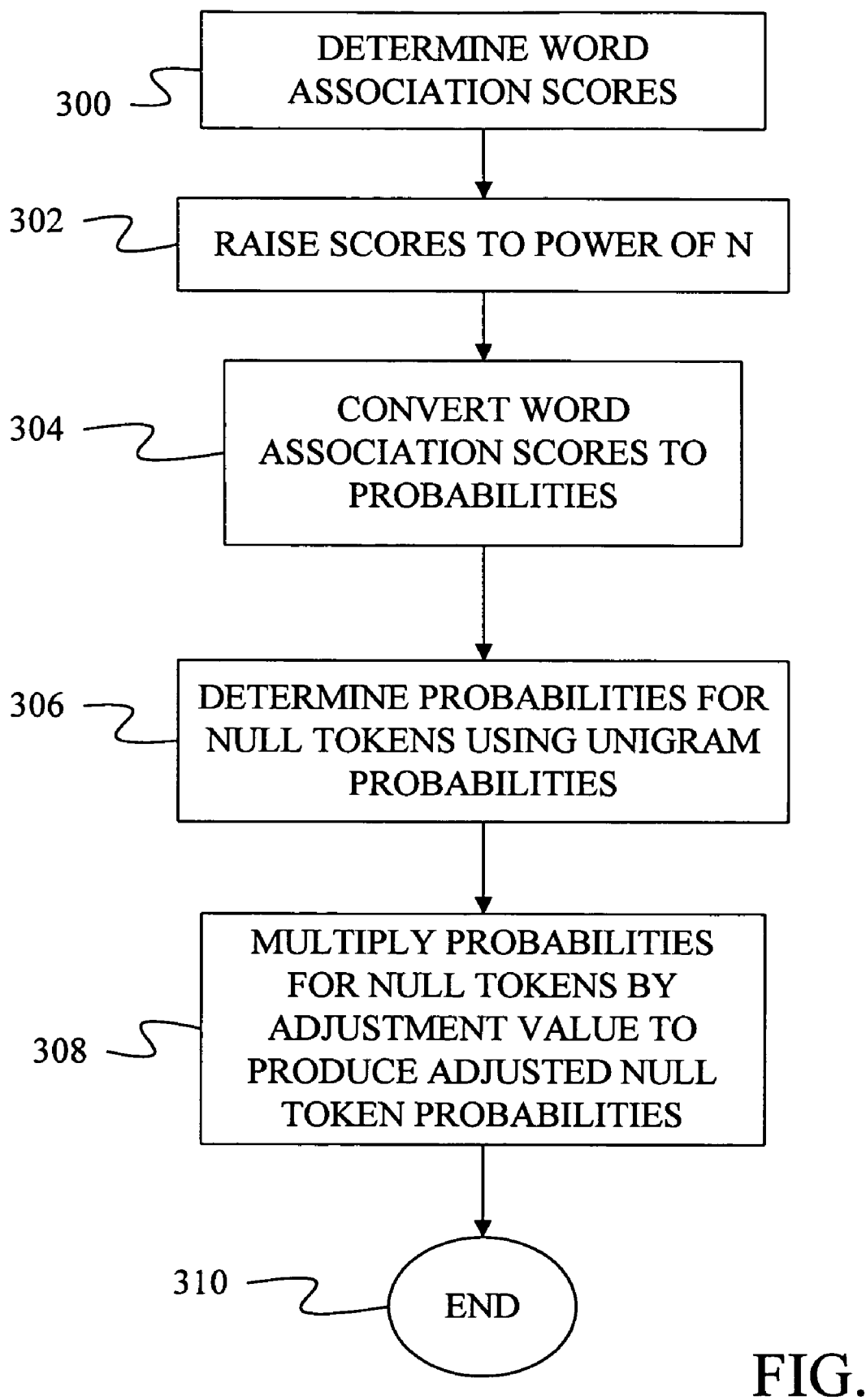
FIG. 3 is a flow diagram of a method of estimating translation probabilities under one particular embodiment of the present invention.

FIG. 3 provides a flow diagram of a method of estimating translation probabilities under one specific embodiment of the present invention. The process of FIG. 3 begins at step 300 where a word association score is generated for each word pair that can be formed from the words in the source language and the target language. For example, a log-likelihood-ratio can be determined for each word pair. Word pairs with log-likelihood-ratio scores less than a minimum threshold, e.g., 0.9, may be dismissed from further consideration. At step 302, the word association scores are modified by raising them to a power of n, where n is between 1.3 and 1.7. After step 302, the modified word association scores are converted into probability estimates at step 304. This is done by summing the modified word association scores for each source word and identifying the source word with the largest sum. Each modified word association score is then divided by the largest sum. At step 306, probabilities for alignments between target words and null source words are set equal to the unigram probabilities of the target words. The probabilities for the null source words are then multiplied by an adjustment value at step 308. Under one embodiment, this adjustment value is 2.4. After step 308, the process ends at step 310 with the translation probabilities estimated at steps 304 and 308 being used as the final translation probabilities.

Figure 4:
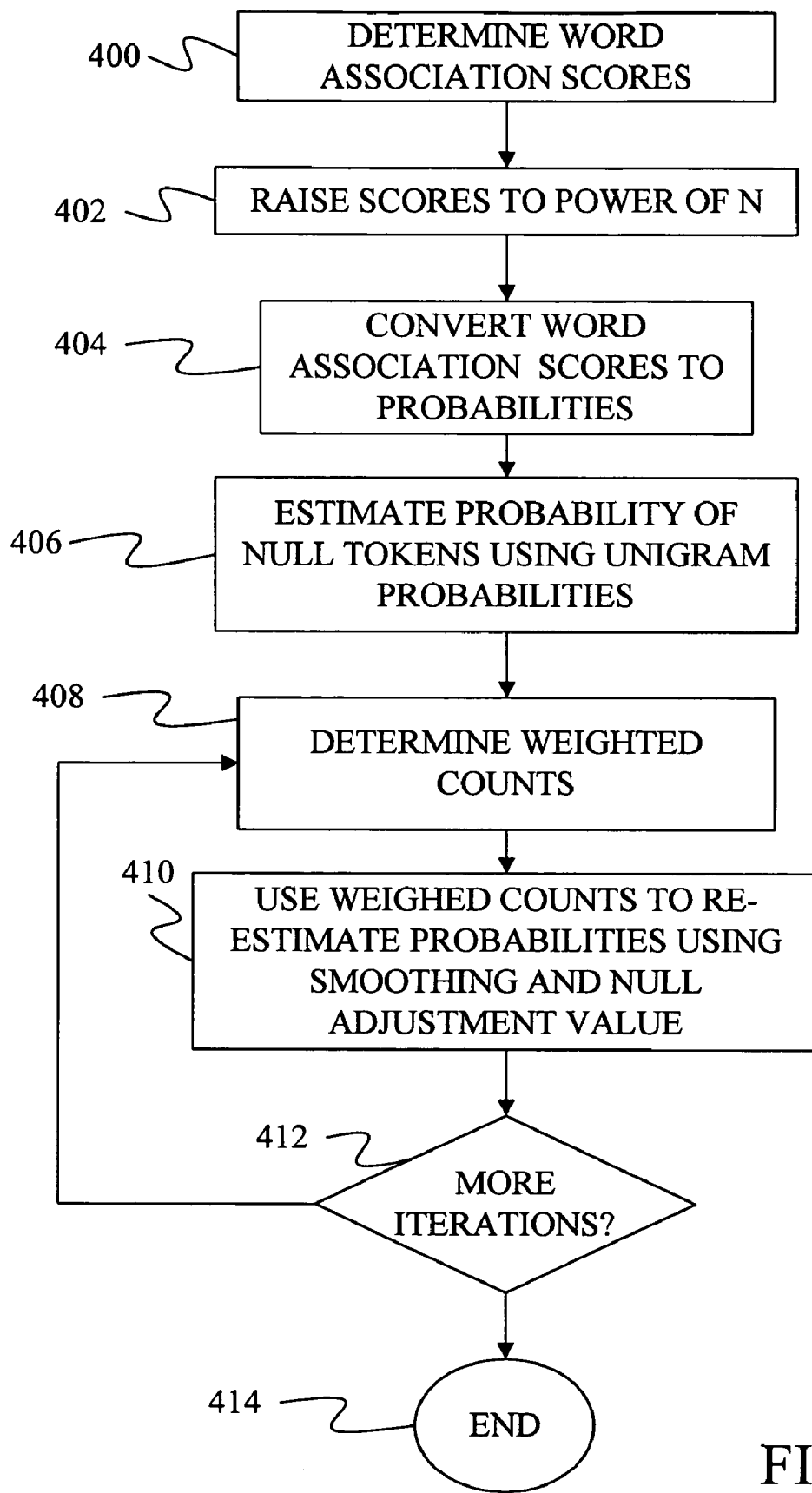
FIG. 4 is a flow diagram of a method of estimating translation probabilities under an alternative embodiment of the present invention.

FIG. 4 provides a flow diagram of a second specific method for estimating translation probabilities. In step 400 of FIG. 4, a word association score is determined and at step 402 the word association score is modified by raising it to a power of n. Under one embodiment, the word association score is an LLR score and it is raised to the power of 1.5. At step 404, the modified word association scores are converted into probabilities by dividing each modified word association score by the largest sum of the modified word association scores associated with any one source word. Probabilities for translations involving a null token are then estimated at step 406 by using the unigram probability of the target word involved in the translation as the translation probability.

At step 408, weighted counts are determined for each translation word pair using equation 4 above.

At step 410, the weighted counts are used to estimate translation probabilities for each word pair using the add-n smoothing of equation 5 above. Under one embodiment, a value of 0.0005 is used for n. In other embodiments, n is set to zero. When estimating the translation probabilities for null tokens, the probabilities are first estimated using Equation 5. Those translation probabilities are then adjusted. Under one embodiment, the translation probabilities are adjusted by multiplying the translation probabilities estimated using Equation 5 by an adjustment value of 10.0.

After the probabilities have been estimated at step 410, the process determines if more iterations should be performed at step 412. Under one embodiment, only a single iteration is performed before the process ends at step 414. In other embodiments, multiple iterations are performed by returning to step 408 to update the weighted counts. Steps 408, 410, and 412 are repeated until the desired number of iterations have been performed.

Figure 5:
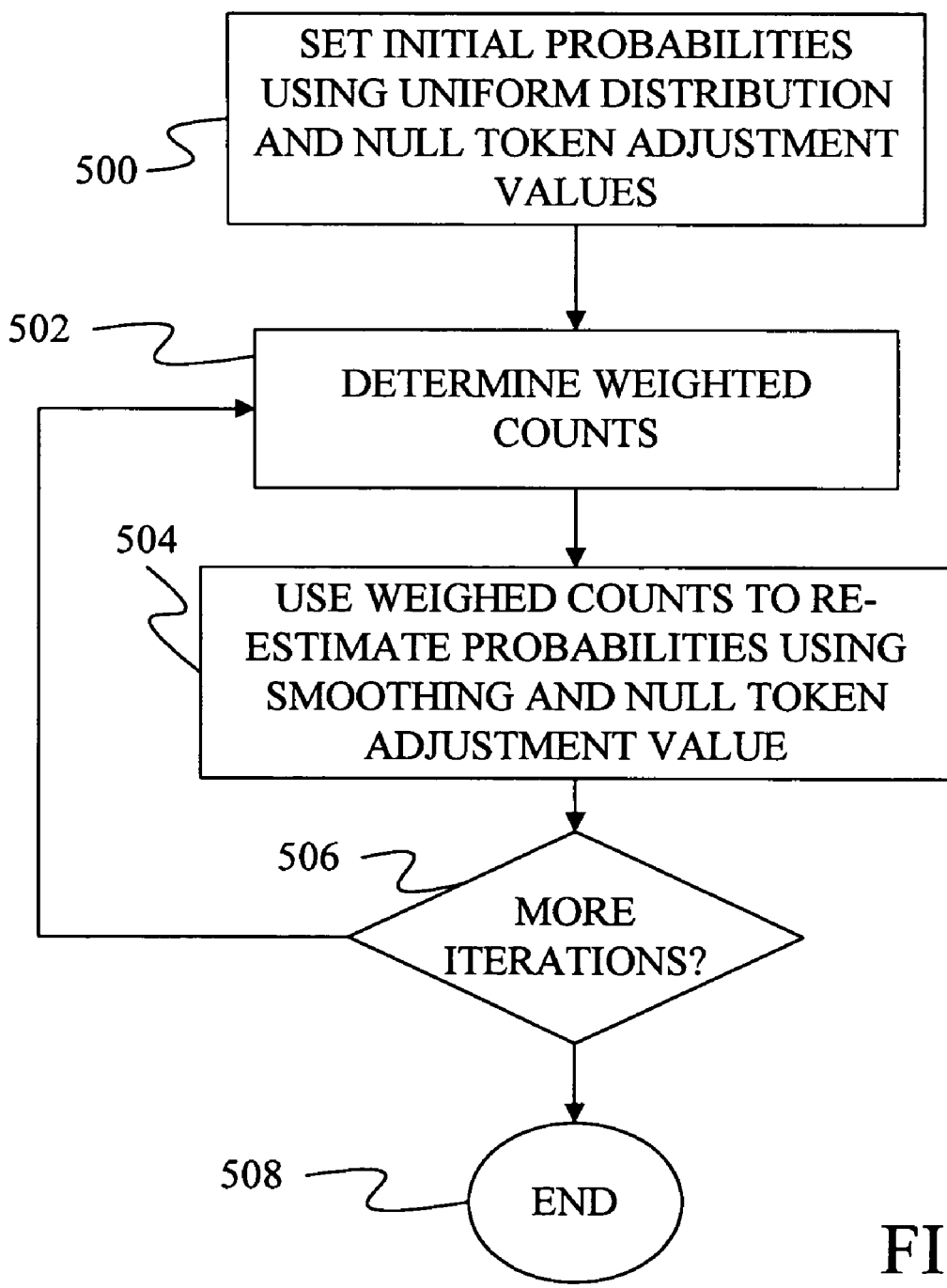
FIG. 5 is a flow diagram of a method of estimating translation probabilities under a further alternative embodiment of the present invention.

FIG. 5 provides a flow diagram of a third specific method under the present invention for estimating translation probabilities. In step 500, the translation probabilities are initially set to the same uniform distribution value. Under one embodiment, the probabilities for the null token are then multiplied by an adjustment value of 10.0. At step 502, weighted counts are determined using equation 4 above. At step 504, the weighted counts are used to estimate new values for the translation probabilities while using the add-n smoothing of Equation 5. Under one embodiment, n is equal to 0.01. The translation probabilities for the null tokens are estimated by first using Equation 5 to form a translation probability and then adjusting that translation probability. Under one embodiment, the translation probability is adjusted by multiplying the translation probability by an adjustment value of 10.0.

At step 506, the process determines if more iterations are to be performed. Under one embodiment, 14-20 iterations are performed. If more iterations are to be performed, the process returns to step 502 to determine new values for the weighted counts and steps 504 and 506 are repeated. Once enough iterations have been performed at step 506, the process ends at step 508.

Although the present invention has been described with reference to particular embodiments, workers skilled in the art will recognize that changes may be made in form and detail without departing from the spirit and scope of the invention.

What is claimed is:

1. A method of estimating translation probabilities, the method comprising:
   determining word association scores, wherein the word association scores comprise scores for word translations involving source words that occur infrequently that are always substantially lower than the scores for the highest scoring translations involving source words that occur more frequently;
   converting the word association scores into initial translation probabilities;
   using the initial translation probabilities to initialize an iterative training algorithm; and
   estimating revised translation probabilities using the iterative training algorithm.

2. The method of claim 1 wherein the word association scores comprise log-likelihood-ratio scores.

3. The method of claim 1 wherein converting the word association scores comprises:
   for each source word in a set of source words, determining a sum of word association scores associated with the source word;
   identifying the largest sum; and
   dividing each word association score by the largest sum.

4. The method of claim 1 further comprising setting at least one initial translation probability for a translation from a null token to a target word.

5. The method of claim 4 wherein setting an initial translation probability for a translation from a null token to a target word comprises setting the initial translation probability equal to the unigram probability of the target word.

6. The method of claim 4 wherein setting an initial translation probability for a translation from a null token to a target word further comprises modifying a unigram probability to produce an adjusted initial translation probability.

7. The method of claim 6 wherein modifying a unigram probability to produce an adjusted initial translation probability comprises multiplying the unigram probability by an adjustment value.

8. The method of claim 6 wherein the iterative training algorithm comprises an Expectation-Maximization algorithm.

9. The method of claim 1 wherein estimating revised translation probabilities comprises estimating a revised translation probability for a translation from a null token to a target word through steps comprising:
   forming a modified translation probability using the iterative training algorithm; and
   estimating the revised translation probability from the modified translation probability such that the revised translation probability is larger than the modified translation probability.

10. The method of claim 1 wherein estimating revised translation probabilities comprises applying smoothing.

11. The method of claim 1 wherein converting word association scores comprises raising the word association scores to a power.

12. A computer-readable storage medium having computer-executable instructions for performing steps comprising:
   converting a set of word alignment scores into translation probabilities;
   setting a translation probability for a translation from a null token to a target word, wherein setting a translation probability for a translation from a null token to a target word comprises setting the translation probability equal to the unigram probability of the target word; and
   modifying the translation probabilities based on a bilingual corpus to produce modified translation probabilities.

13. The computer-readable storage medium of claim 12 wherein the word alignment scores provide alignment scores for word pairs that appear infrequently in the bilingual corpus that are always substantially lower than the scores for the highest scoring word pairs that appear more frequently in the bilingual corpus.

14. The computer-readable storage medium of claim 12 wherein converting a set of word alignment scores comprises raising each word alignment score to a power.

15. The computer-readable storage medium of claim 12 wherein converting the set of word alignment scores comprises generating a separate sum of word alignment scores for each of a set of source words and dividing each word alignment score by the largest sum.

16. The computer-readable storage medium of claim 12 wherein setting a translation probability for a translation from a null token to a target word further comprises adjusting the unigram probability to form a translation probability that is larger than the unigram probability.

17. The computer-readable storage medium of claim 12 wherein modifying the translation probabilities comprises utilizing smoothing.

18. The computer-readable storage medium of claim 12 wherein modifying the translation probabilities comprises adjusting translation probabilities associated with null tokens to increase the translation probabilities.

* * * * *